No. 767,861. Patented August 16, 1904.

UNITED STATES PATENT OFFICE.

ALEXANDER EPHRAIM BROWN, OF CLEVELAND, OHIO, ASSIGNOR TO THE BROWN HOISTING MACHINERY COMPANY, OF CLEVELAND, OHIO, AN INCORPORATED COMPANY.

ADJUSTABLE CARRIER-BAR.

SPECIFICATION forming part of Letters Patent No. 767,861, dated August 16, 1904.

Application filed April 20, 1904. Serial No. 203,992. (No model.)

*To all whom it may concern:*

Be it known that I, ALEXANDER EPHRAIM BROWN, a citizen of the United States, residing at Cleveland, in the county of Cuyahoga and State of Ohio, have invented a new and useful Adjustable Carrier-Bar for Use in Suspending and Retaining Blocks and Packages of Various Kinds, of which the following is a specification.

Although my said invention is adapted for use in any connection where articles are to be slung and lifted and by whatsoever hoisting mechanism may be convenient, a marked advantage of its application or employment is for the purpose of grappling merchandise in either bulk or single boxes or crates or where, on the other hand, many pieces are to be brought within the range of its operation and thereafter compactly and securely retained in one load while the latter is being transferred by overhead or like conveying appliances to wharf, warehouse, or storage-space.

In the drawings accompanying and making a part of this specification, Figure 1 is a side view in the full lines of my carrier-bar when used in connection with a chain sling and attached platform to raise a package without and in the dotted lines to raise the same with compression. Fig. 2 is an end view of the conditions assumed in Fig. 1.

In said drawings, B is the carrier-bar proper. It is preferably constructed by removing the upper flange of an I-beam of the desired length between the extreme points thereof and then serrating and indenting the edge thus obtained into a series of indentations or notches $b\ b\ b$ of suitable size and pitch to receive and retain the hooks or loops H and H, to which the sling-chains are to be attached.

S is a hoisting-sheave of an overhead tramway, shown as preferably connected to the bar B by a clevis $v$ and a bolt $v'$, that passes through a hole in said bar provided for the purpose.

P is a package sustained by ordinary sling appliances in connection with my said adjustable carrier-bar when compression by the chain slings C is not important, and P' shows a load or package similarly sustained, but having the chain slings brought together about the same for the purpose, particularly when said load is made up of several pieces, of thereby firmly gripping and holding them together during transit.

As is apparent, the form of sling I indicate in the drawings consists of a base or platform of any convenient material or mode of construction, to the corners of which the chains C and C' are attached and brought together in opposing pairs. At the points of union of the members of each pair extension-chains may be connected, as desired. The hooks I show are preferably provided with a loop-shaped extension to their rear of suitable dimensions to be passed over and along the carrier-bar B as occasion requires. The precise form of this part of the hooks H H is not material, although, as is manifest, said parts must be adapted to both movably overhang the bar B and fit within its notches $b$ and of course to also permit the chains C C' to be hooked or otherwise secured to its lower portion. As a specific feature of said bar I provide the guards or terminal stops E E at the ends of the same to insure against the escape of a hook during any vertical oscillation of the bar. Said stops may be made either integral with the bar or by additions thereto.

The manner of using said bar is self-evident. When employed in connection with an overhead carrier for unloading vessels along a dock, the bar having been attached below and to the hoisting-sheave, as shown, may be rapidly lowered into the hold where a load has been prepared upon a sling for transportation. When a number of articles are to be carried that admit of being packed in a crate or box specially prepared for the service, it will be found desirable to have such crate or box with a horizontal dimension corresponding substantially with the length of the carrier-bar, and in operation the bar should be turned immediately above the box to tally with said horizontal dimension in the relative position shown in the full lines of Fig. 1. The hooks may now be run out to the bar ends and the sling-chains attached thereto, whereupon during the lift the chain's pull will be vertical and the crate or load will not be subjected to compression by the same. When, however, the load is made up of several loosely-piled articles or packages, the hooks may be moved inwardly, so that the sling-chains when duly attached to the same shall converge above the pile or load and bind it securely together.

Having thus described my said device, what I claim as new, and desire to secure by Letters Patent, is—

A carrier-bar for slings and like tackle consisting of a bar or piece serrated along its upper edge, as described, and provided with terminal stops or guards at the extremities of the same, substantially as shown and described.

ALEXANDER EPHRAIM BROWN.

In presence of—
HOWARD A. COUSE,
F. G. TALLMAN.